Jan. 25, 1949.  N. M. WINSLOW ET AL  2,459,907

METHOD OF CONDUCTING CHEMICAL REACTIONS

Filed Sept. 4, 1942

INVENTORS
NATHANIEL M. WINSLOW
GEORGE W. HEISE
BY
ATTORNEY

Patented Jan. 25, 1949

2,459,907

UNITED STATES PATENT OFFICE 2,459,907

METHOD OF CONDUCTING CHEMICAL REACTIONS

Nathaniel M. Winslow, Lakewood, and George W. Heise, Rocky River, Ohio, assignors to National Carbon Company, Inc., a corporation of New York Application September 4, 1942, Serial No. 457,330

7 Claims. (Cl. 260—580)

This invention is concerned with improvements in the conduct of chemical reactions involving fluids. Such reactions include those between gases, between liquids, and between a liquid and a gas, in each instance both non-catalytic and catalytic.

A usual way to conduct such a reaction is in a column packed with granular materials or shaped objects providing an extended surface. The reactants may be passed through the column concurrently, or a gas may be passed countercurrently to a liquid. If a solid catalyst is required, it is usually supported on the surface of the packing material.

Packed columns have shortcomings, some of which are particularly evident when such columns are used to conduct heterogeneous catalytic reactions which involve the interaction of gases with liquids in the presence of solid catalysts. These shortcomings are inherent in each of the packings heretofore proposed. For instance, packings permit to some extent the channeling of gases and liquids, the accumulation of reactants or products in local voids, and stratification of the catalyst. Many ingenious expedients have been proposed, with varying degrees of success, to overcome these undesirable features, but none has provided a complete and permanent cure.

Even more serious, particularly in the case of highly exothermic reactions in which there is the possibility of over-reaction, decomposition, or polymerization at too-elevated temperatures, is the low rate of heat transfer from one packing granule or object to another and from the packing material to the wall of the reaction vessel. Such low rate of heat transfer encourages the persistence of localized hot spots where the temperature is above that desired.

In accordance with the present invention, the disadvantages and shortcomings just discussed are overcome, and unique advantages are achieved, by conducting a reaction in a vessel having walls of impervious material, such as carbon, of good heat conductivity and a filling, joined to such walls, comprising a porous unitary or monolithic mass of material also of good heat conductivity and preferably composed of carbon on the pore surfaces of which a catalyst may be supported.

The invention is more particularly described with reference to the accompanying drawing, in which.

Figure 1:
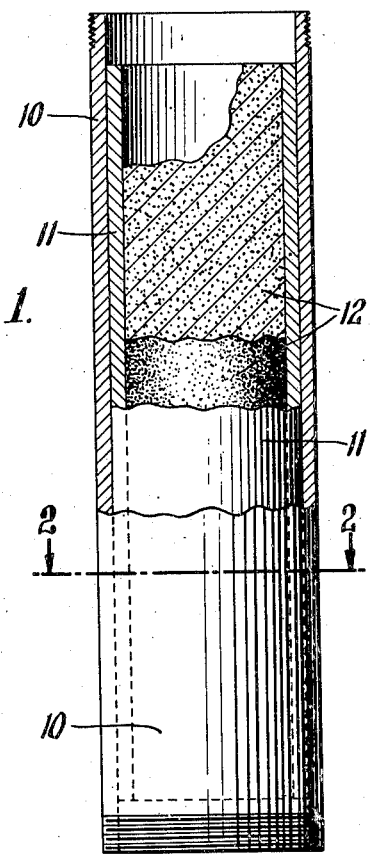
Fig. 1 is a vertical section (along the line 1—1 of Fig. 2) illustrating one typical embodiment of the invention.
Figure 3:
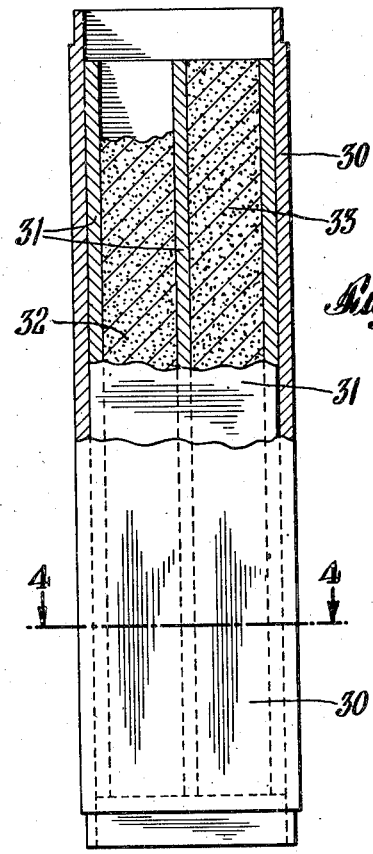
Figure 2:
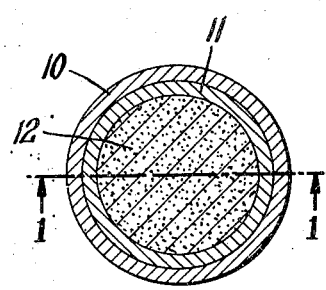
Fig. 2 is a horizontal section taken along line 2—2 of Fig. 1.
Figure 4:
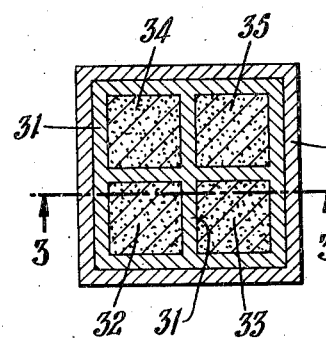

Fig. 3 is a vertical section (along the line 3—3 of Fig. 4) illustrating a modification of the embodiment shown in Figs. 1 and 2; and Fig. 4 is a horizontal section taken along line 4—4 of Fig. 3.

As shown in Figs. 1 and 2, apparatus for carrying out the process of the invention may comprise an impervious tube 10, of carbon having a core 12 of porous carbon joined thereto by a bond 11 of carbon, the core 12 serving as the contact mass for the reaction. The tube 10 need not be circular in cross-section, but may have any cross-section. For instance, a square tube 30 may be used as illustrated in Figs. 3 and 4. Also, if desired a large core may be built up, as shown in Figs. 3 and 4, of smaller sections 32, 33, 34 and 35 joined by a bond 31 running longitudinally of the tube 30.

Although for a limited number of processes it is possible to use a porous metal for the core material 12, 32, 33, 34, and 35, it is generally preferred to use a porous carbon. The carbon may be in the state usually called "amorphous carbon" or it may be partially or wholly in the "graphitic carbon" state. In any event, a material should be used which has a coefficient of thermal conductivity at least as great as that of porous carbon. Most of the available types of porous carbon have a thermal conductivity coefficient above 0.001 gram calorie/second/centimeter/square centimeter/C°.

Likewise, either a metal or a carbon tube 10 or 30 may be used. If a different material is used for the tube than for the core, materials having similar coefficients of thermal expansion are preferred.

When the preferred structure, comprising a porous carbon core and an impervious carbon tube, is used a suitable bond 11 or 31 may be made of expanded graphite as described in application Serial No. 299,848, filed by Hamister and Winslow on October 17, 1939, now Patent 2,300,503, issued November 3, 1942.

The porous carbon contact masses for use in the practice of this invention may be formed in various ways. In general, carbon with a highly developed surface achieved only in conjunction with a high adsorption power, for example, activated carbon, is not desired. The properties requisite to the use of carbon for this invention are a high degree of porosity and formability, and any carbon possessing these properties may be used. A useful form of carbon for many reactions may be made from calcined hardwood charcoal particles oxidized with steam at 600° C. to a weight loss of around 10% to 30%; but various calcined and partially oxidized coke carbons, or mixtures of wood chars and coke carbons, may be used. The carbon is mixed with a small amount of pitch as a binder, formed by heat and pressure into the desired shapes, and baked to convert the pitch into a carbon bond. The porous carbon may then be further treated at suitable temperatures to convert the carbon to graphite or to impart a degree of "activity," as desired. Porous carbons of the kinds used as electrodes in air-depolarized alkaline primary cells are suitable. The fineness of the particles, the amount and kind of binder, and the molding conditions will largely determine the porosity of the formed shape.

Catalytic material may be deposited in or on the carbon surfaces by various means which are, in general, known in the art of supported catalyst. For example, the carbon may be immersed in a solution containing a soluble compound of the catalytic agent convertible to the desired catalyst, and thereafter dried and treated to convert the soluble compound to the insoluble form of catalytic material desired. Conversion procedures are known, and may include reduction, oxidation, chlorination or decomposition of the substances giving rise to the insoluble catalytic material by chemical means or by heat. The amount of the actual catalytic substance to be deposited in or on the porous carbon may vary widely in accordance with the reaction to be promoted. Generally, in the case of the common metallic catalysts, from as little as 0.5% to as much as 40% of the combined weight of carbon and catalyst is sufficient.

The apparatus just described, comprising porous carbon bonded by graphite into an impervious carbon tube, provides a continuous body of chemically-resistant material of high thermal conductivity supporting, when desired, a catalyst. Accurate control of the temperature of the catalyst surface, with a small gradient of temperature across the section of the tube, can be effected by controlling the temperature on the outer surface of the tube. By applying heat to a portion of the outer surface of the tube adjacent the inlet or reaction zone, heat is readily supplied to the reactants; by applying a cooling agent or coolant to the outer surface of the tube adjacent the reaction zone or outlet, heat is readily extracted from the reaction products. Relatively abrupt temperature gradients along the length of the tube may be effected in the same manner, and when such abrupt gradients are desired a carbon tube is particularly advantageous. Stratification, channeling, and eddying of fluids within the tube are avoided, and the tubes can be supported vertically or horizontally without danger of stratification of the fluids or of the catalyst. The carbon will act as a catalyst promoter in many kinds of reactions.

Many kinds of gas-phase reactions may be carried out in the apparatus just described. For instance, in the field of organic chemical reactions, such reactions as halogenation, addition of hydrogen halide to an olefin, hydration and dehydration, hydrogenation and dehydrogenation, oxidation, and pyrolysis, may be carried out advantageously.

Of particular importance is the use of the apparatus to conduct heterogeneous catalytic reactions which involve the interaction of gases with liquids, in which said gases are incompletely soluble, in the presence of solid catalysts. A typical example of such a reaction is the reduction of nitrobenzene to aniline by reaction with hydrogen in the presence of a platinum catalyst. The following results have been obtained when carrying out this reaction in accordance with the invention:

*Example 1.*—A porous carbon block made of calcined hardwood charcoal particles was oxidized by steam at 600° C. to a weight loss of 20% and then was formed in the shape of a cylinder 4.75 inches long and having a diameter of 1⅜ inch. This cylinder was then fitted into an iron reaction tube having an inside diameter of about 1¼ inch to which it was bonded by expanded graphite. The porous carbon was impregnated with a solution of platinic chloride which was decomposed to provide metallic platinum amounting to about 0.5% by weight of the total porous carbon mass. The section of the reactor containing this mass was enclosed in an electrical heater and connected at one end to liquid and gas inlets and at the opposite end of the porous carbon mass to a receiver for liquid products. The receiver was provided with a gas outlet through a condenser.

The carbon contact mass was heated to and maintained at about 100° C. and hydrogen and nitrobenzene were passed in concurrently through the gas and liquid inlets. The nitrobenzene was passed through at a rate of one cubic centimeter per minute, and the hydrogen was used at about 175% of the theoretical requirement. A mixture of aniline and water was collected in the liquid receiver, and excess hydrogen was removed through the condenser. The conversion of nitrobenzene to aniline under these conditions was about 97%.

*Example 2.*—An impervious tube was filled with a porous carbon mass, containing 0.5% by weight of platinum, made from the type of carbon ordinarily used as air-depolarized electrodes in alkaline galvanic cells. When passed through this mass at 100° C., hydrogen and nitrobenzene reacted to yield aniline at recoveries varying between 75% and 100% of the nitrobenzene for different runs.

The reaction of nitrobenzene with hydrogen is referred to only as an example of the type of reactions which can be conducted with improved results by virtue of this invention, and the invention is applicable generally to the conduct of catalyzed reactions between a gas and a liquid in which neither the catalyst nor the gas are wholly soluble.

This invention provides many advantages over the previously proposed expedients. In comparison with methods in which gas is passed through a liquid containing suspended catalyst, the passage of the gaseous reactant, or of both the gas and liquid concurrently, through porous carbon supporting the catalyst and wetted by the liquid results in reduction of the thickness of the liquid film at the catalytic surface to such a degree as virtually to eliminate solubility (or the lack of it) as a factor in the reaction. In comparison with methods in which countercurrent flow in packed or tray-containing towers is used, the present invention provides far greater contact surface and reactant availability at the catalytic surface than is possible with tower reactors. As compared with any previously used methods for carrying out reactions of this type, the improvements of this invention make possible better heat

We claim:

1. Method of conducting a reaction between fluid reactants which comprises passing said reactants concurrently through a unitary mass of porous carbon bonded by carbon to and within and filling the cross section of an impervious tube.

2. Method of conducting and controlling a reaction at elevated temperatures between a gaseous reactant and a liquid reactant in which the gaseous reactant is substantially insoluble which comprises passing said reactants concurrently through a unitary mass of porous carbon bonded by carbon to and within and filling the cross section of an impervious tube, and adding heat to the reactants by applying heat to a portion of the outer surface of said tube.

3. Method of conducting a reaction between a gaseous reactant and a liquid reactant in which the gaseous reactant is not wholly soluble which comprises passing both reactants concurrently through a unitary mass of porous material selected from the group consisting of porous metals and porous carbon bonded by carbon to and within and filling the cross section of an impervious tube.

4. Method of conducting a reaction between an organic liquid reactant and a gaseous reactant which is substantially insoluble therein which comprises passing both reactants concurrently through a unitary mass of porous carbon enclosed within and filling the cross section of an impervious tube to which said mass is bonded by carbon.

5. Method of conducting and controlling a reaction at elevated temperatures between an organic liquid reactant and a gaseous inorganic reactant which is substantially insoluble therein which comprises passing both reactants through a unitary mass of porous carbon supporting a catalyst and bonded by carbon to and within and filling the cross section of an impervious tube.

6. Method of reducing nitrobenzene to aniline which comprises passing nitrobenzene and hydrogen concurrently through a unitary mass of porous carbon supporting a platinum catalyst and bonded by carbon to and within and filling the cross section of an impervious metal tube, and applying heat to the outer surface of said tube.

7. Method of conducting and controlling a reaction at elevated temperatures between a gaseous reactant and a liquid reactant in which the gaseous reactant is substantially insoluble, which comprises passing said reactants concurrently through a unitary mass of porous carbon bonded by carbon to and within and filling the cross section of an impervious tube, and applying a cooling agent to the outer surface of at least a portion of said tube.

NATHANIEL M. WINSLOW.
GEORGE W. HEISE.

REFERENCES CITED

The following references are of record in the file of this patent:

UNITED STATES PATENTS

| Number | Name | Date |
| --- | --- | --- |
| 1,157,293 | Brockbank | Oct. 19, 1915 |
| 1,481,957 | Cederburg | Jan. 29, 1924 |
| 1,530,392 | Morrell | Mar. 17, 1925 |
| 1,842,197 | Portail | Jan. 19, 1932 |
| 1,845,280 | Jaeger | Feb. 16, 1932 |
| 1,960,951 | Oppenheim | May 29, 1934 |
| 1,961,164 | Pietzsch | June 5, 1934 |

FOREIGN PATENTS

| Number | Country | Date |
| --- | --- | --- |
| 526,001 | Germany | June 3, 1931 |

Certificate of Correction

Patent No. 2,459,907.  January 25, 1949.

NATHANIEL M. WINSLOW ET AL.

It is hereby certified that error appears in the printed specification of the above numbered patent requiring correction as follows:

Column 4, line 39, for the word "about" read *above*;

and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*